United States Patent
Peng

(10) Patent No.: US 12,028,469 B2
(45) Date of Patent: Jul. 2, 2024

(54) ELECTRONIC DEVICE AND INFORMATION PROCESSING METHOD

(71) Applicant: Lenovo (Beijing) Limited, Beijing (CN)

(72) Inventor: Shaopeng Peng, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 192 days.

(21) Appl. No.: 17/474,522

(22) Filed: Sep. 14, 2021

(65) Prior Publication Data
US 2022/0103671 A1   Mar. 31, 2022

(30) Foreign Application Priority Data
Sep. 30, 2020   (CN) .......... 202011063053.X

(51) Int. Cl.
*H04M 1/02*   (2006.01)
*G06F 1/16*   (2006.01)

(52) U.S. Cl.
CPC ........ *H04M 1/0268* (2013.01); *G06F 1/1686* (2013.01); *H04M 1/0264* (2013.01); *H04M 2201/38* (2013.01)

(58) Field of Classification Search
CPC ............. H04M 1/0268; H04M 1/0264; H04M 2201/38; H04M 1/0241; G06F 1/1686; G06F 1/1626; G06F 1/1652; G06F 3/0412; G06F 3/0418; G06T 1/0007; G06T 5/007; G06T 2200/28
See application file for complete search history.

(56) References Cited

FOREIGN PATENT DOCUMENTS

| CN | 107170384 A | 9/2017 | |
|----|-------------|--------|---|
| CN | 111314610 A | 6/2020 | |
| CN | 108200327 B | * 9/2020 | .......... H04M 1/0264 |
| CN | 111327822 B | * 7/2021 | .......... H04N 5/23299 |

* cited by examiner

*Primary Examiner* — Zhitong Chen
(74) *Attorney, Agent, or Firm* — ANOVA LAW GROUP, PLLC

(57) ABSTRACT

The present disclosure provides an electronic device. The electronic device includes a flexible display screen and an image capturing element. A capturing area of the image capturing element corresponds to a first area of the flexible display screen for the image capturing element to obtain external light through the first area if the flexible display screen is in a first state. The capturing area of the image capturing element corresponds to a second area of the flexible display screen for the image capturing element to obtain external light through the second area if the flexible display screen is in a second state. The first state and the second state are different, and the first area and the second area are at least partially different.

15 Claims, 7 Drawing Sheets

Determine that the first area of the flexible display screen corresponds to the capturing area of the image capturing element, such that the image capturing element can obtain external light through the first area if the flexible display screen is in the first state Determine that the second area of the flexible display screen corresponds to the capturing area of the image capturing element, such that the image capturing element can obtain external light through the second area if the flexible display screen is in the second state

FIG. 13

ELECTRONIC DEVICE AND INFORMATION PROCESSING METHOD

CROSS-REFERENCES TO RELATED APPLICATION

This application claims priority to Chinese Patent Application No. 202011063053.X, entitled "Electronic Device and Information Processing Method," filed on Sep. 30, 2020, the entire content of which is incorporated herein by reference.

FIELD OF TECHNOLOGY

The present disclosure relates to the technical field of electronic technology and, more specifically, to an electronic device and an information processing method.

BACKGROUND

With the development of display technology, the application of flexible display screens has become more and more common, and more and more research efforts are being devoted to the development of flexible display screens. However, when an electronic device with a flexible display screen captures an image in front of the electronic device, the captured image is often incomplete, which affects the user experience.

BRIEF SUMMARY OF THE DISCLOSURE

One aspect of the present disclosure provides an electronic device. The electronic device includes a flexible display screen and an image capturing element. A capturing area of the image capturing element corresponds to a first area of the flexible display screen for the image capturing element to obtain external light through the first area if the flexible display screen is in a first state. The capturing area of the image capturing element corresponds to a second area of the flexible display screen for the image capturing element to obtain external light through the second area if the flexible display screen is in a second state. The first state and the second state are different, and the first area and the second area are at least partially different.

Another aspect of the present disclosure provides an information processing method. The method includes determining a relative position of a flexible display screen of an electronic device and an image capturing element of the electronic device based on a state of the flexible display screen if the image capturing element is in an activated state.

BRIEF DESCRIPTION OF THE DRAWINGS

In order to more clearly illustrate technical solutions in embodiments of the present disclosure, drawings for describing the embodiments are briefly introduced below. Obviously, the drawings described hereinafter are only some embodiments of the present disclosure, and it is possible for those ordinarily skilled in the art to derive other drawings from such drawings without creative effort.

FIG. 13 is a flowchart of an information processing method according to an embodiment of the present disclosure.

DETAILED DESCRIPTION

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Many specific details are provided in the following description, so as to facilitate the full comprehension of the disclosure. However, the disclosure may be implemented by using other methods different from the methods described herein; and those skilled in the art can make similar extension without departing from the conception of the present disclosure. Therefore, the present disclosure is not limited to the following disclosed specific implementations.

Moreover, the present disclosure is described in detail with reference to the schematic diagrams, and when expatiating the embodiments of the present disclosure, to facilitate the description, the cross-sectional views showing device structures will be partially enlarged not according to the general proportion, but they should not be construed as limitations of the present disclosure. In addition, during actual manufacturing, the sizes in three dimensions, that is, length, width and depth, should be included.

As described above, when an electronic device with a flexible display screen captures an image in front of the electronic device, the captured image is often incomplete, which affects the user experience.

Figure 1:
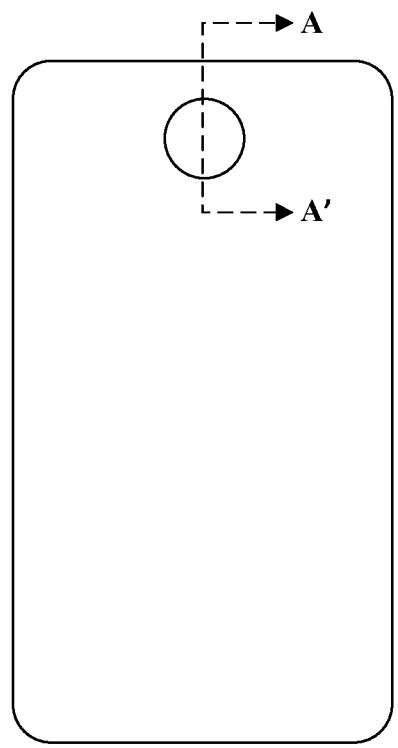
FIG. 1 is a schematic structural diagram of an electronic device according to an embodiment of the present disclosure.
Figure 2:
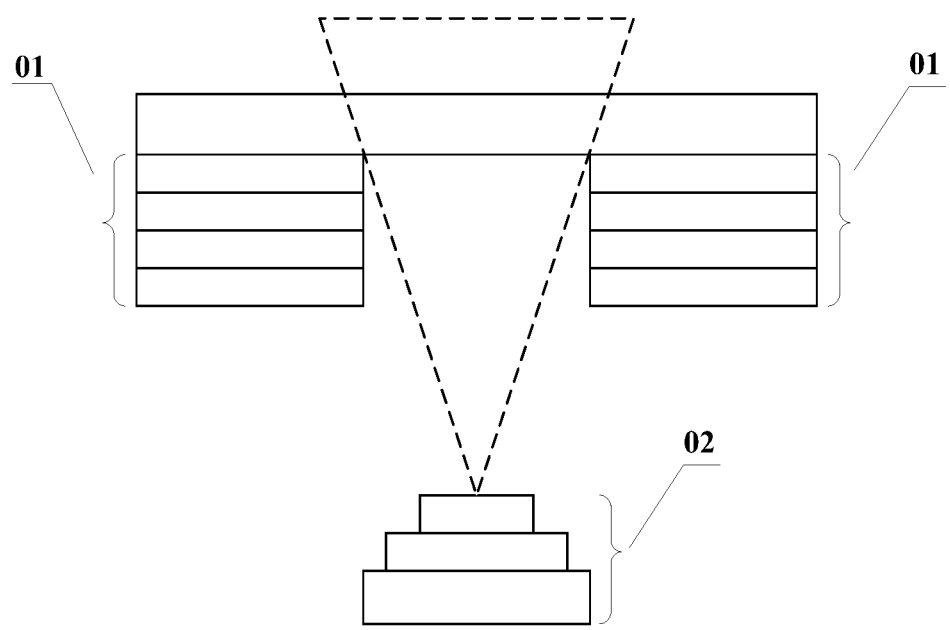
FIG. 2 is a cross-sectional view of the electronic device shown in FIG. 1 along the AA' direction.
Figure 3:
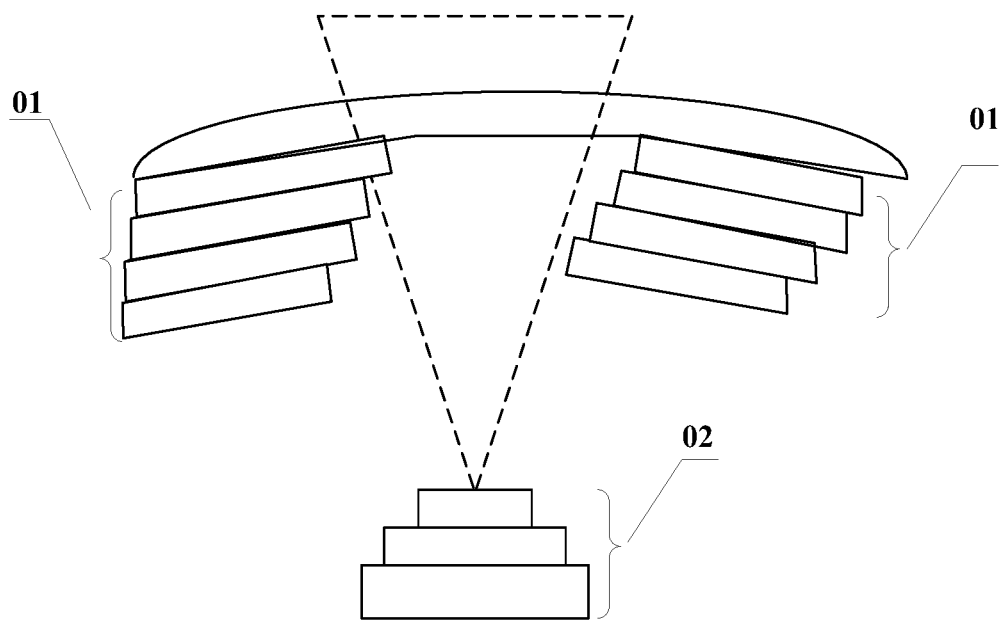
FIG. 3 is another cross-sectional view of the electronic device shown in FIG. 1 along the AA' direction.

As shown in FIG. 1 to FIG. 3, FIG. 2 is a cross-sectional view of an electronic device shown in FIG. 1 along the AA' direction when the flexible display screen of the electronic device is in a non-folding state, and FIG. 3 is a cross-sectional view of the flexible display screen shown in FIG. 1 along the AA' direction when the flexible display screen is in a folded state. It can be seen from FIG. 1 to FIG. 3 that during the folding process of the electronic device with a flexible display screen 01, the film layers in the flexible display screen 01 will be misaligned to a certain extent. As a result, at least a part of the flexible display screen 01 blocks the image capturing area of a camera 02 of the electronic device, resulting in incomplete images captured by the electronic device when capturing images, which affects the user experience.

Figure 4:
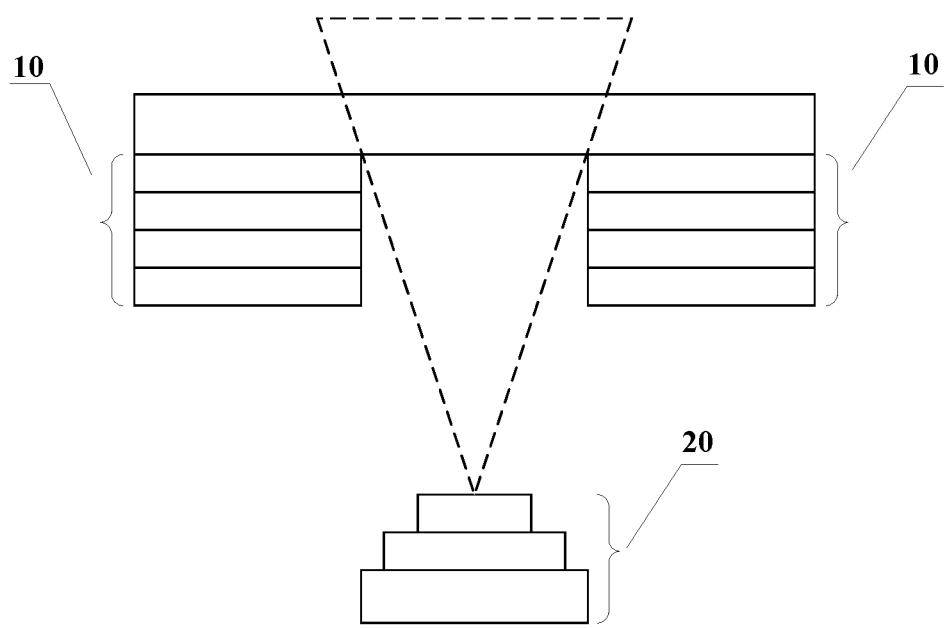
FIG. 4 is a partial cross-sectional view of the electronic device in a first state according to an embodiment of the present disclosure.
Figure 5:
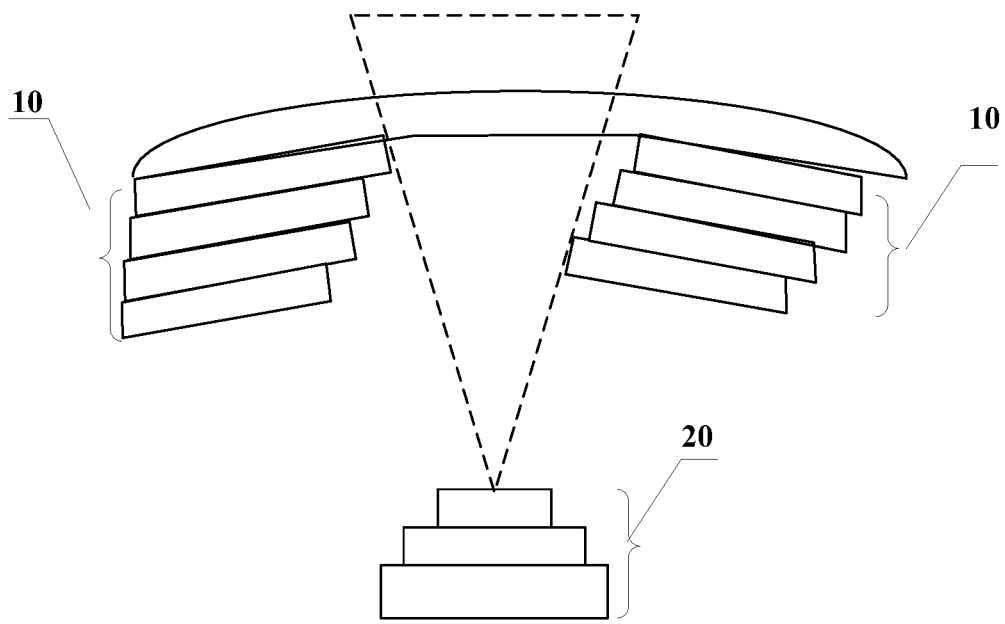
FIG. 5 is a partial cross-sectional view of the electronic device in a second state according to an embodiment of the present disclosure.

In view of the above, an embodiment of the present disclosure provides an electronic device. As shown in FIG. 4 and FIG. 5, the electronic device includes a flexible display screen 10 and an image capturing element 20. In the embodiments of the present disclosure, as shown in FIG. 4, if the flexible display screen 10 is in a first state, the capturing area of the image capturing element 20 corresponds to a first area of the flexible display screen 10, such that the image capturing element 20 can obtain external light through the first area. As shown in FIG. 5, if the flexible display screen 10 is in a second state, the capturing area of the image capturing element 20 corresponds to a second area of the flexible display screen 10, such that the image capturing element 20 can obtain external light through the second area. In some embodiments, the first state may be different from the second state, and the first area may be at least partially different from the second area. Therefore, when the flexible display screen 10 is in a different state, the image capturing element 20 can correspond to different areas of the flexible display screen 10, such that the capturing areas of the image capturing element 20 can receive external light. In this way, the image captured by the image capturing element 20 is relatively complete, and the user experience is improved.

It should be noted that in the embodiments of the present disclosure, the image capturing element corresponding to the first area of the flexible display screen may be the light transmitted from the first area to an area where the image capturing element is positioned can completely cover the capturing area of the image capturing element. Similarly, the image capturing element corresponding to the second area of the flexible display screen may be the light transmitted from the second area to an area where the image capturing element is positioned can completely cover the capturing area of the image capturing element.

Figure 6:
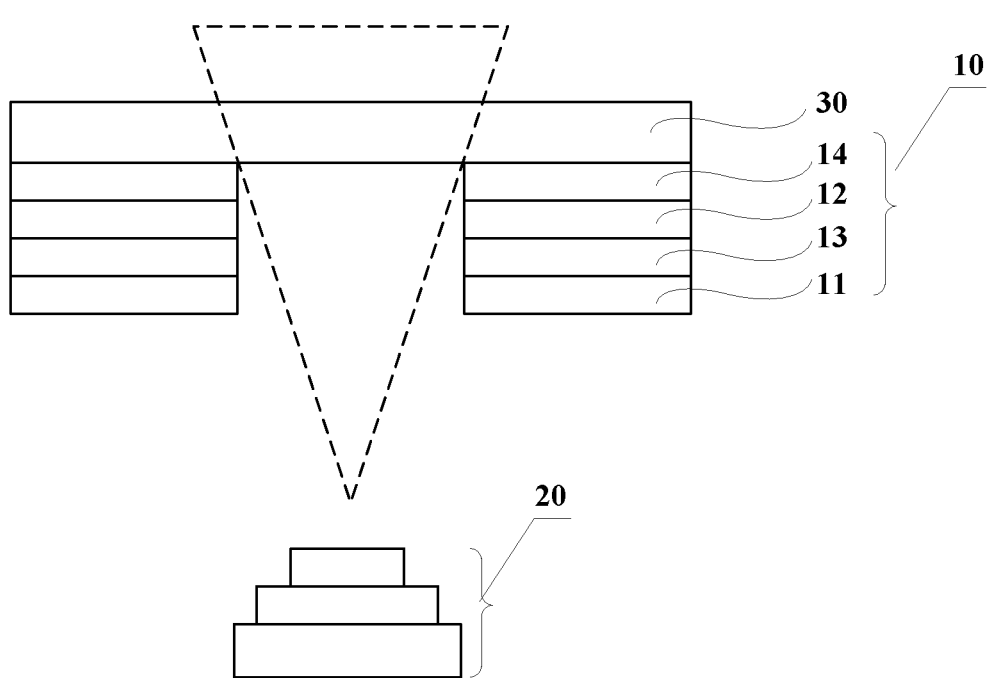
FIG. 6 is a partial cross-sectional view of the electronic device according to an embodiment of the present disclosure.

In some embodiments, as shown in FIG. 6, the flexible display screen includes a substrate 11 and a display touch layer 12, where the substrate 11 and the display touch layer 12 may be fixedly connected by an adhesive layer 13.

In some embodiments, as shown in FIG. 6, the electronic device further includes a cover plate 30 covering the flexible display screen 10 to protect the flexible display screen 10. The cover plate 30 may be fixedly connected to the display touch layer of the flexible display screen 10 through an adhesive layer 14.

Figure 7:
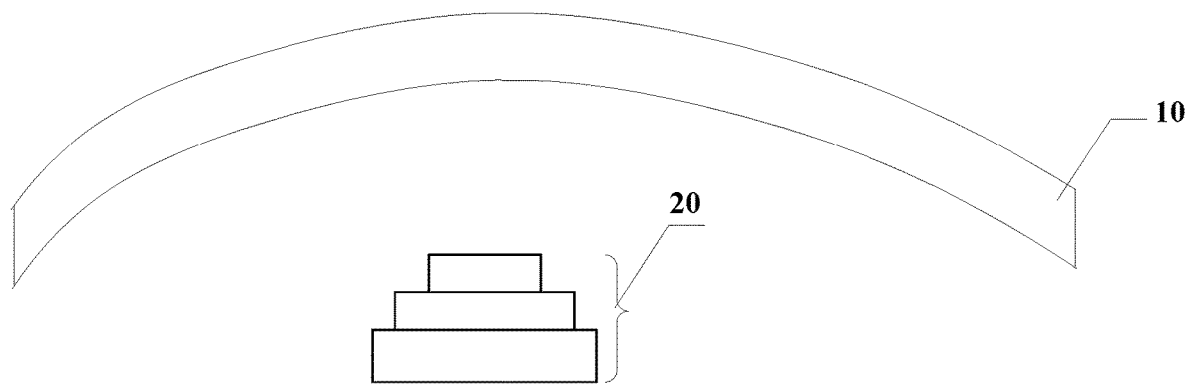
FIG. 7 is a schematic diagram of the electronic device when a flexible display screen is an outward-folding display screen according to an embodiment of the present disclosure.
Figure 8:
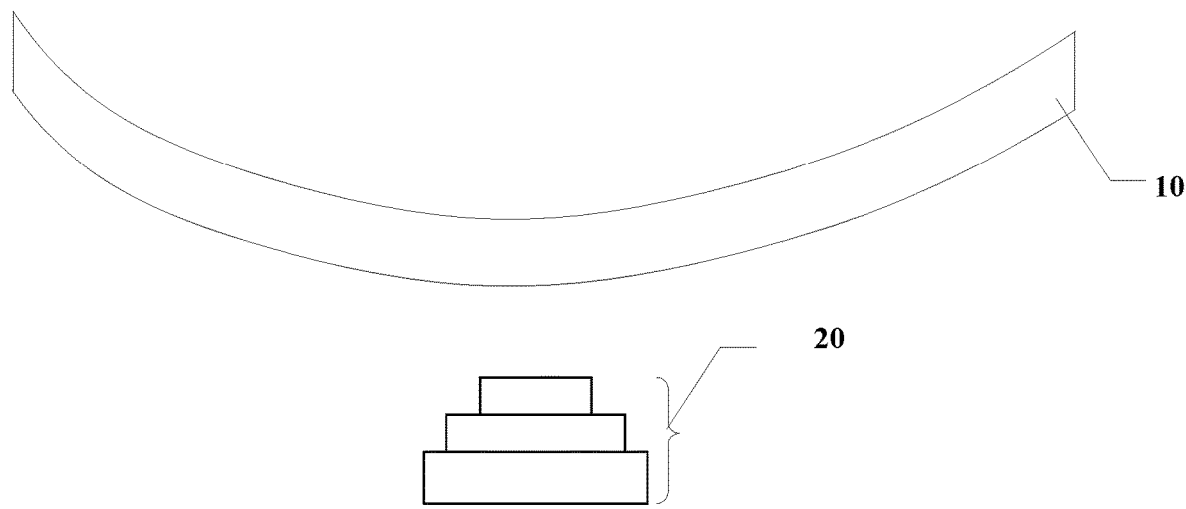
FIG. 8 is a schematic diagram of the electronic device when the flexible display screen is an inward-folding display screen according to an embodiment of the present disclosure.

More specifically, in one embodiment of the present disclosure, as shown in FIG. 7, the flexible display screen is an outward-folding display screen. That is, when the flexible display screen is in a folded state, the display surface of the flexible display screen may be a convex surface, and the first state and the second state may be any two states when the flexible display screen is in a folded state. In another embodiment of the present disclosure, as shown in FIG. 8, the flexible display screen is an inward-folding display screen. That is, when the flexible display screen is in a folded state, the flexible display screen may be a concave surface. In the embodiments of the present disclosure, the first state and the second state may be any two states when the flexible display screen is in a folded state and the flexible display screen is not folded in half. It should be noted that in the embodiments of the present disclosure, if the flexible display screen is an inward-folding display screen, the flexible display screen, the flexible display screen being in the half-folded state may be that when the flexible display screen is in the folded state, two opposite display surfaces of the flexible display screen are in direct contact with each other.

In some embodiments, the flexible display screen may include a first display part and a second display part. In the first state, a first angle may be formed between the first display part and the second display part, and in the second state, a second angle may be formed between the first display part and the second display part. The first angle may be smaller than the second angle. However, the present disclosure is not limited thereto. In other embodiments of the present disclosure, depending on the situation, the first angle may also be greater than the second angle. The following description will be made by taking the first angle being smaller than the second angle as an example.

It should be noted that in the embodiments of the present disclosure, the angle between the first display part and the second display part may be the angle formed between the display surface of the first display surface of the first display part and the display surface of the second display part. More specifically, if the flexible display screen is an outward-folding display screen, the first angle and the second angle may be any two angles between 180°-360°, including the endpoint values. Further, if the flexible display screen is an inward-folding display screen, the first angle and the second angle may be any two angles between 0°-180°, including 180°, but not including 0°.

In some embodiments, the flexible display screen may include a first pixel area and a second pixel area, and the interval between pixels in the first area may be greater than the interval between pixels in the second pixel area. In the embodiments of the present disclosure, the first area and the second area may both belong to the first pixel area, such that the image capturing element realized by the setting the interval of the first pixel area can receive light transmitted through the first area and the second area.

In some embodiments, if the flexible display screen is an inward-folding display screen, the first angle may be smaller than the second angle, the area of the first area may be greater than the area of the second area, and the first area may be positioned within the range of the second area. That is, the greater the degree of folding of the flexible display screen, the larger the area of the area corresponding to the capturing area of the image capturing element in the flexible display screen. Therefore, by increasing the light-transmitting area in the flexible display screen, the misalignment of film layers in the flexible display screen that causes the image captured by the image acquisition element to be incomplete can be avoided, thereby improving user experience.

In some embodiments, if the flexible display screen is an outward-folding display screen, the first angle may be smaller than the second angle, the area of the first area may be smaller than the area of the second area, and the first area may include the second area That is, the greater the degree of folding of the flexible display screen, the larger the area of the area corresponding to the capturing area of the image capturing element in the flexible display screen. Therefore, by increasing the light-transmitting area in the flexible display screen, the misalignment of film layers in the flexible display screen that causes the image captured by the image acquisition element to be incomplete can be avoided, thereby improving user experience.

It should be noted that in the foregoing embodiment, regardless of the angle between the first display part and the second display part, all areas in the flexible display screen corresponding to the capturing area of the image capturing element may be positioned in the first pixel area.

It should also be noted that although increasing the area corresponding to the capturing area of the image capturing element in the flexible display screen can alleviate the misalignment of the various film layers affecting the image capturing area of the image capturing element during the folding process of the flexible display screen, however, this will sacrifice part of the display area of the electronic device, which is not beneficial to the development trend of full-screen display, and will also affect the user experience.

Therefore, in another embodiment of the present disclosure, the electronic device may change the area of the flexible display screen corresponding to the capturing are of the image capturing element by adjusting the interval between the pixels in the flexible display screen.

More specifically, in some embodiments, if the flexible display screen is in the first state and the image capturing element is in an activated state, the interval between the pixels in the first area may be controlled to be a first interval, and the interval between pixels in the display area of the flexible display screen other than the first area can be controlled to be a second interval. The first interval may be greater than the second interval such that when the image capturing element is in the activated state, by setting the interval between the pixels in the first area as the first interval, the interval between the pixels in the first area can be increased, such that the image capturing element can receive the external light. Further, by setting the interval between the pixels in other areas of the flexible display screen as the second interval, the proportion of the display area in the flexible display screen can be ensured, and the display area of the flexible display screen can be increased.

In some embodiments, if the flexible display screen is in the second state and the image capturing element is in the activated state, the interval between pixels in the second area can be controlled to be the first interval, and the interval between pixels in the display area of the flexible display screen other than the second area can be controlled to be the second interval. The first interval may be greater than the second interval such that when the image capturing element is in the activated state, by setting the interval between the pixels in the second area as the first interval, the interval between the pixels in the second area can be increased, such that the image capturing element can receive the external light. Further, by setting the interval between the pixels in other areas of the flexible display screen as the second interval, the proportion of the display area in the flexible display screen can be ensured, and the display area of the flexible display screen can be increased.

In some embodiments, if the flexible display screen is switched from the first state to the second state and the image capturing element is in the activated state, the interval between at least some pixels in the first pixel area may be dynamically adjusted to the first interval, thereby realizing the switch from the first state to the second state.

In some embodiments, if the first area and the second area at least partially overlap, the flexible display screen is switched from the first state to the second state, and the image capturing element is in the activated state, the interval between pixels in the second area that does not overlap with the first area in the first pixel area may be dynamically adjusted to the first interval to realize the switch from the first area to the second area. In this way, when the capturing area of the image capturing element corresponds to the second area, the amount of light that the image capturing element received can be increased. In some embodiments, if the first area and the second area at least partially overlap, the flexible display screen is switched from the first state to the second state, and the image capturing element is in the activated state, the interval between pixels in the first area that does not overlap with the second area in the first pixel area may also be dynamically adjusted to the second interval. In this way, on the basis of realizing the switching from the first area to the second area, the display quality of the area that does not overlap with the second area in the first area can be improved, thereby improving the display quality of the electronic device.

In some embodiments, if the first area and the second area do not overlap, then if the flexible display screen is switched from the first state to the second state, and the image capturing element is in the activated state, the interval between pixels in the second area in the first pixel area may be dynamically adjusted to the first interval to realize the switching from the first area to the second area. In this way, when the capturing area of the image capturing element corresponds to the second area, the amount of light that the image capturing element received can be increased. In some embodiments, if the first area and the second area do not overlap, when the flexible display screen is switched from the first state to the second state and the image capturing element is in the activated state, the interval between pixels in the first area in the first pixel area may also be dynamically adjusted to the second interval. In this way, on the basis of realizing the switching from the first area to the second area, the display quality of the first area can be improved, thereby improving the display quality of the electronic device.

In some embodiments, if the flexible display screen is switched from the second state to the first state and the image capturing element is in the activated, the interval between at least some pixels in the first pixel area may be dynamically adjusted to the first interval to realize the switching form the second area to the first area.

In some embodiments, if the first area and the second area at least partially overlap, then if the flexible display screen is switched from the second state to the first state and the image capturing element is in the activated state, the interval between pixels in the first area that does not overlap with the second area in the first pixel area may be dynamically adjusted to the first interval to realize the switching from the second area to the first area. In this way, when the capturing area of the image capturing element corresponds to the first area, the amount of light that the image capturing element receives can be increased. In some embodiments, if the second area and the first area at least partially overlap, the flexible display screen is switched from the second state to the first state, and the image capturing element is in the activated state, the interval between pixels in the second area that does not overlap with the first area in the first pixel area may also be dynamically adjusted to the second interval. In this way, on the basis of realizing the switching from the second area to the first area, the display quality of the area that does not overlap with the first area in the second area can be improved, thereby improving the display quality of the electronic device.

In some embodiments, if the first area and the second area do not overlap, then if the flexible display screen is switched from the second state to the first state, and the image capturing element is in the activated state, the interval between pixels in the first area in the first pixel area may be dynamically adjusted to the first interval to realize the switching from the second area to the first area. In this way, when the capturing area of the image capturing element corresponds to the second area, the amount of light that the image capturing element received can be increased. In some embodiments, if the first area and the second area do not overlap, when the flexible display screen is switched from the second state to the first state and the image capturing element is in the activated state, the interval between pixels in the second area in the first pixel area may also be dynamically adjusted to the second interval. In this way, on the basis of realizing the switching from the second area to the first area, the display quality of the second can be improved, thereby improving the display quality of the electronic device.

In some embodiments, if the image capturing element is in a non-activated state, the interval between pixels in the entire display area of the flexible display screen may be the second interval, where the first interval may be greater than the second interval. In this way, when the image capturing element is in the non-activated state, the interval between pixels in the first area and/or the second area may be the second interval, such that the pixel intervals of all display areas in the flexible display screen can be the same, and the display quality of the electronic device can be improved.

In one embodiment of the present disclosure, dynamically adjusting the interval between at least part of the pixels in the first pixel area may include dynamically adjusting the density of pixels in at least part of the first pixel area to dynamically adjust the interval between at least some pixels in the first pixel area. In another embodiment of the present disclosure, dynamically adjusting the interval between at least part of the pixels in the first pixel area may include dynamically adjusting the density of pixels in at least part of the first pixel area and the display area of each pixel in the area to dynamically adjust the interval between at least part of the pixels in the first pixel area. The method of dynamically adjusting the interval between at least part of the pixels in the first pixel area is not limited in the present disclosure, and the method can be determined based on actual needs.

Figure 9:
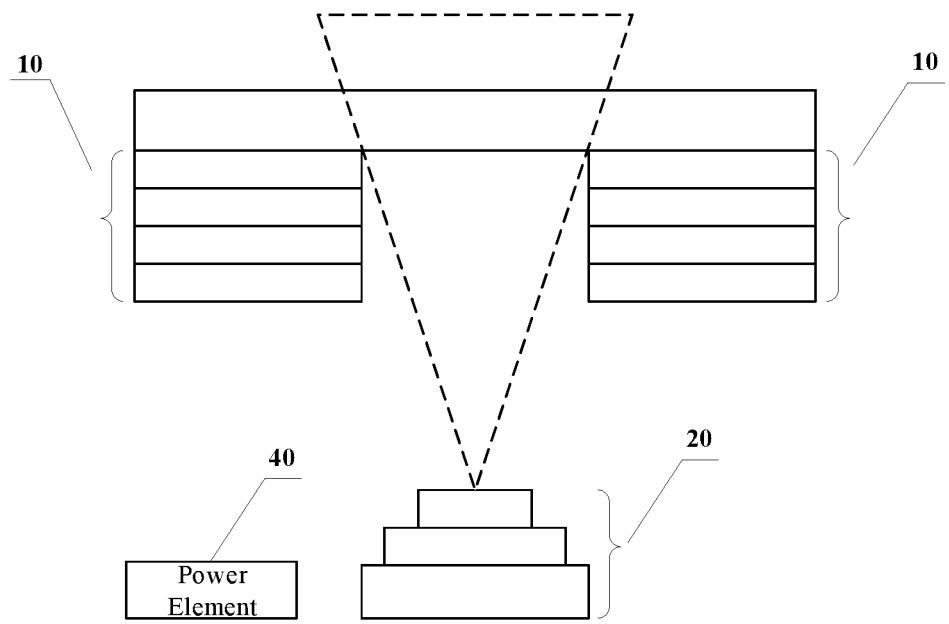
FIG. 9 is a partial cross-sectional view of the electronic device according to an embodiment of the present disclosure.

In some embodiments, as shown in FIG. 9, the electronic device further includes a power element 40. The power element 40 may be configured to adjust the relative position of the flexible display screen 10 and the image capturing element 20 if the image capturing element 20 is in the activated state. In this way, when the flexible display screen 10 is in the first state, the first area of the flexible display screen 10 may correspond to the capturing area of the image capturing element 20, and when the flexible display screen 10 is in the second state, the second area of the flexible display screen 10 may correspond to the capturing area of the image capturing element 20. In some embodiments, when the flexible display screen is in a different state, the area in the flexible display screen corresponding to the capturing area of the image capturing element may not be completely the same.

In one embodiment, if the image capturing element is in the activated state, the power element may adjust the relative position of the flexible display screen and the image capturing element by adjusting the position of the flexible display screen. In another embodiment, if the image capturing element is in the activated state, the power element may adjust the relative position of the flexible display screen and the image capturing element by adjusting the position of the image capturing element. In another embodiment, if the image capturing element is in the activated state, the power element may adjust the relative position of the flexible display screen and the image capturing element by simultaneously adjusting the position of the flexible display screen and the position of the image capturing element. The specific method of adjusting the relative position of the flexible display screen and the image capturing element is not limited in the present disclosure, and the method can be determined based on actual needs.

The following describes the adjustment of the relative position of the flexible display screen and the image capturing element using the power element by taking the adjustment of the position of the image capturing element as an example when the image capturing element is in the activated state.

In some embodiments, if the flexible display screen is in the first state, the power element may control the image capturing element to be positioned at a first position such that the capturing area of the image capturing element can correspond to the first area of the flexible display screen; and, if the flexible display screen is in the second state, the power element may control the image capturing element to be positioned in a second position such that the capturing area of the image capturing element can correspond to the second area of the flexible display screen, where the first position may be different from the second position.

Figure 10:
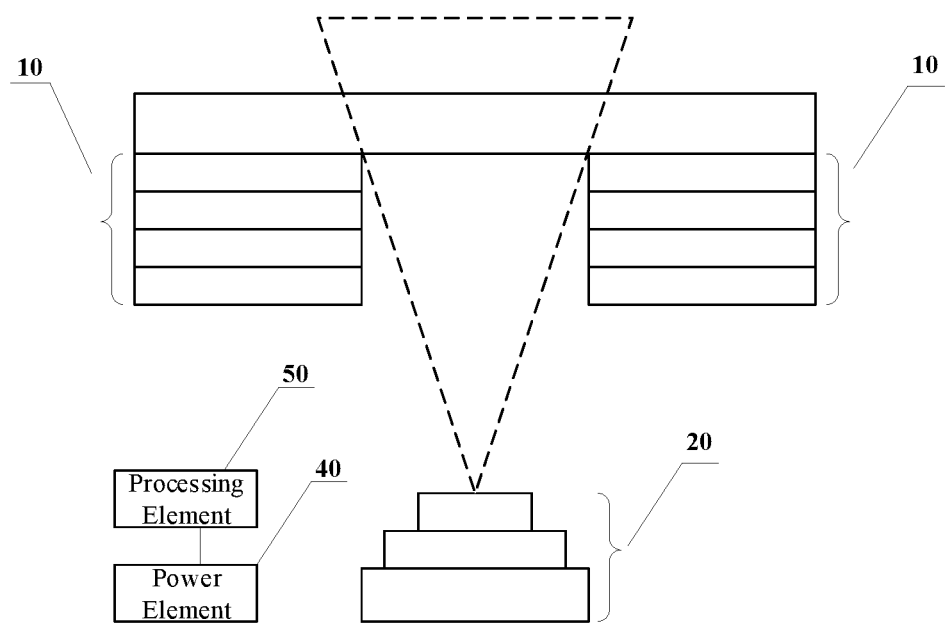
FIG. 10 is a partial cross-sectional view of the electronic device according to an embodiment of the present disclosure.

In some embodiments, as shown in FIG. 10, the electronic device further includes a processing element 50. The processing element 50 may be configured to generate a trigger signal when the image capturing element 20 is in the activated state. The trigger signal can be used to trigger the power element 40 to adjust the relative position of the image capturing element 20 and the flexible display screen 10, but the present disclosure is not limited thereto. In some embodiments, the power element 40 may also be configured to adjust the relative position of the image capturing element 20 and the flexible display screen 10 under external triggering. For example, the electronic device may further include a trigger element. The trigger element may be triggered by a user to generate a trigger signal to trigger the power element to adjust the relative position of the image capturing element and the flexible display screen, however, the present disclosure is not limited thereto.

In some embodiments, the processing element may also be configured to obtain the state of the image capturing element. When the image capturing element is in the activated state, the processing element may generate a trigger signal to trigger the power element to adjust the relative position of the image capturing element and the flexible display screen, however, the present disclosure is not limited thereto.

Figure 11:
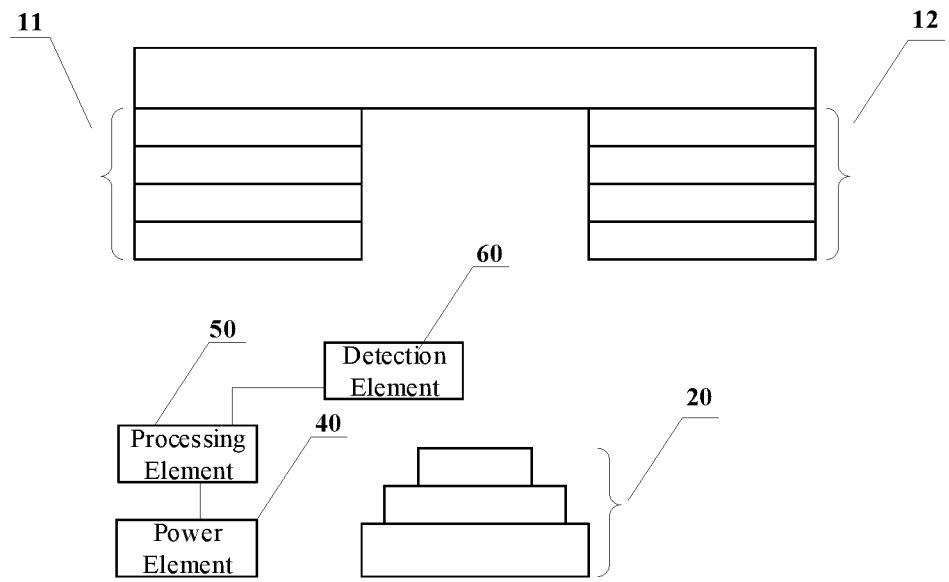
FIG. 11 is a partial cross-sectional view of the electronic device according to an embodiment of the present disclosure.

In some embodiments, as shown in FIG. 11, the electronic device further includes a detection element 60. The detection element 60 may be configured to detect an angle between a first display part 11 and a second display part 12. In some embodiments, the processing element 50 may be further configured to determine the relative position of the image capturing element 20 and the flexible display screen based on the angle between the first display part 11 and the second display part 12.

In some embodiments, the processing element may be further configured to determine the position of the image capturing element based on the angle between the first display part and the second display part to adjust the relative position of the image capturing element and the flexible display screen. In some embodiments, when the angles between the first display part and the second display part are different, the position of the image capturing element may be different.

In some embodiments, the electronic device may further include a storage element. The storage element may be configured to store the correspondence between the angle between the first display part and the second display part, and the movement distance of the image capturing element. In some embodiments, the processing element may be configured to determine the position of the image capturing element based on the angle between the first display part and the second display part and the corresponding relationship of the moving distance of the image capturing element to realize the adjustment of the relative position of the flexible display screen and the image capturing element.

In some embodiments, the detection element may be a sensor, such as an angle sensor, to detect the angle between the first display part and the second display part, however, the present disclosure is not limited thereto.

In some embodiments, the processing element may be further configured to determine the relative position of the image capturing element and the flexible display screen based on a plurality of preview images generated at different positions of the image capturing element when the image capturing element is in the activated state.

Take the power element adjusting the position of the image capturing element as an example. In one embodiment, using the processing element to determine the position of the image capturing element based on the preview images generated by the image capturing element at different positions to determine the relative position of the image capturing element and the flexible display screen may include moving the image capturing element in a first direction by the power element, and obtaining a preview image generated by the image capturing element; if the amount of image information included in the preview image generated by the image capturing element increases, continue moving the image capturing element in the first direction until the amount of image information included in the preview image generated by the image capturing element stops increasing; and if the amount of image information included in the preview image generated by the image capturing element reduces, moving the image capturing element in a second direction until the amount of image information included in the preview image generated by the image capturing element stops increasing, where the second direction may be opposite to the first direction, and the first direction and the second direction may be parallel to a direction in which the first display part points to the second display part.

It should be noted that in the foregoing embodiment, the position where the preview image generated by the image capturing element including the largest amount of image information may be the position of the image capturing element.

In some embodiments, the power element may include a stepping motor to dynamically adjust the relative position of the image capturing element and the flexible display screen through the stepping motor.

Figure 12:
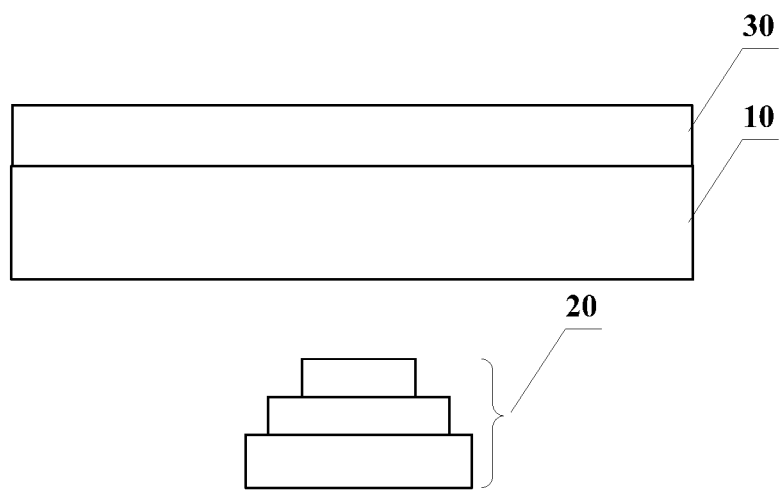
FIG. 12 is a partial cross-sectional view of the electronic device according to an embodiment of the present disclosure.

In some embodiments, the image capturing element may be positioned below the flexible display screen. As shown in FIG. 12, the flexible display screen 10 is a complete display screen, and the image capturing element 20 is positioned below the non-display side of the flexible display screen 10. In the embodiments of the present disclosure, if the image capturing element is in the activated state, the first area or the second area may be controlled to be a transparent area. More specifically, if the image capturing element is in the activated state and the flexible display screen is in the first state, the first area may be controlled to be a transparent area. Further, if the image capturing element is in the activated state and the flexible display screen is in the second state, the second may be controlled to be a transparent area. That is, if the image capturing element is in the activated state, the area corresponding to the capturing area of the image capturing element in the flexible display screen may be controlled to be a transparent area such that the image capturing element obtain external light through the flexible display screen.

In some embodiments, as shown in FIG. 6, the flexible display screen 10 includes a first through hole, the capturing area of the image capturing element 20 corresponds to the first through hole, and the external light is obtained through the first through hole. It should be noted that when the flexible display screen 10 includes the first through hole, the first through hole may penetrate the substrate 11 of the flexible display screen 10, the adhesive layer 13 between the substrate 11 and the display touch layer 12, the display touch layer 12, the display touch layer 12, and the adhesive layer 14 between the display touch layer 12 and the cover plate 30 without penetrating the cover plate 30 to ensure the protective effect of the cover plate 30.

Consistent with the present disclosure, when the flexible display screen is in a different state, the image capturing element can correspond to different areas of the flexible display screen. In this way, the capturing area of the image capturing element can receive external light, such that the image captured by the image capturing element is relatively complete, and the user experience is improved.

An embodiment of the present disclosure further provides an information processing method, which can be applied to an electronic device, and the electronic device may include a flexible display screen and an image capturing element. The method includes determining the relative position of the flexible display screen and the image capturing element based on the state of the flexible display screen if the image capturing element is in the activated state.

The information processing method provided by the embodiments of the present disclosure can be used to determine the relative position of the flexible display screen and the image capturing element based on the state of the flexible display screen when the image capturing element is in the activated state. When the flexible display screen is in a different state, the image capturing element may correspond to different areas of the flexible display screen, such that the capturing area of the image capturing element can receive external light. In this way, the images captured by the image capturing element can be complete and the user experience can be improved.

In some embodiments, as shown in FIG. 13, determining the relative position of the flexible display screen and the image capturing element based on the state of the flexible display screen may include determining that the first area of the flexible display screen corresponds to the capturing area of the image capturing element if the flexible display screen is in the first state, such that the image capturing element can obtain external light through the first area; and, determining that the second area of the flexible display screen corresponds to the capturing area of the image capturing element if the flexible display screen is in the second state, such that the image capturing element can obtain external light through the second area. That is, in the embodiments of the present disclosure, if the image capturing element is in the activated state and the flexible display screen is in the first state, determine that the first area of the flexible display screen corresponds to the capturing area of the image capturing element, such that the image capturing element can obtain external light through the first area. Further, if the image capturing element is in the activated state and the flexible display screen is in the second state, determine that the second area of the flexible display screen corresponds to the capturing area of the image capturing element, such that the image capturing element can obtain external light through the second area.

It should be noted that in the embodiments of the present disclosure, the first state may be different from the second state, and the first area may be at least partially different from the second area. Therefore, when the flexible display screen is in a different state, the image capturing element can correspond to different areas of the flexible display screen, such that the capturing areas of the image capturing element can receive external light. In this way, the image captured by the image capturing element is relatively complete, and the user experience is improved.

In some embodiments, the flexible display screen may include a first display part and a second display part. In the first state, a first angle may be formed between the first display part and the second display part, and in the second state, a second angle may be formed between the first display part and the second display part. The first angle may be smaller than the second angle. However, the present disclosure is not limited thereto. In other embodiments of the present disclosure, depending on the situation, the first angle may also be greater than the second angle. The following description will be made by taking the first angle being smaller than the second angle as an example.

It should be noted that in the embodiments of the present disclosure, the angle between the first display part and the second display part may be the angle formed between the display surface of the first display surface of the first display part and the display surface of the second display part. More specifically, if the flexible display screen is an outward-folding display screen, the first angle and the second angle may be any two angles between 180°-360°, including the endpoint values. Further, if the flexible display screen is an inward-folding display screen, the first angle and the second angle may be any two angles between 0°-180°, including 180°, but not including 0°.

In some embodiments, the flexible display screen may include a first pixel area and a second pixel area, and the interval between pixels in the first area may be greater than the interval between pixels in the second pixel area. In the embodiments of the present disclosure, the first area and the second area may both belong to the first pixel area, such that the image capturing element realized by the setting the interval of the first pixel area can receive light transmitted through the first area and the second area.

In some embodiments, if the flexible display screen is an inward-folding display screen, the first angle may be smaller than the second angle, the area of the first area may be greater than the area of the second area, and the first area may be positioned within the range of the second area. That is, the greater the degree of folding of the flexible display screen, the larger the area of the area corresponding to the capturing area of the image capturing element in the flexible display screen. Therefore, by increasing the light-transmitting area in the flexible display screen, the misalignment of film layers in the flexible display screen that causes the image captured by the image acquisition element to be incomplete can be avoided, thereby improving user experience.

In some embodiments, if the flexible display screen is an outward-folding display screen, the first angle may be smaller than the second angle, the area of the first area may be smaller than the area of the second area, and the first area may include the second area That is, the greater the degree of folding of the flexible display screen, the larger the area of the area corresponding to the capturing area of the image capturing element in the flexible display screen. Therefore, by increasing the light-transmitting area in the flexible display screen, the misalignment of film layers in the flexible display screen that causes the image captured by the image acquisition element to be incomplete can be avoided, thereby improving user experience.

It should be noted that in the foregoing embodiment, regardless of the angle between the first display part and the second display part, all areas in the flexible display screen corresponding to the capturing area of the image capturing element may be positioned in the first pixel area.

It should also be noted that although increasing the area corresponding to the capturing area of the image capturing element in the flexible display screen can alleviate the misalignment of the various film layers affecting the image capturing area of the image capturing element during the folding process of the flexible display screen, however, this will sacrifice part of the display area of the electronic device, which is not beneficial to the development trend of full-screen display, and will also affect the user experience.

Therefore, in another embodiment of the present disclosure, if the image capturing element is in the activated state, determining the relative position of the flexible display screen and the image capturing element based on the state of the flexible display screen may include, adjusting the interval between pixels in the flexible display screen to change the area corresponding to the capturing area of the image capturing element in the flexible display screen to determine the relative position of the flexible display screen and the image capturing element based on the state of the flexible display screen, if the image capturing element is in the activated state.

In some embodiments, if the image capturing element is in the activated state, determining the relative position of the flexible display screen and the image capturing element based on the state of the flexible display screen may include, if the flexible display screen is in the first state and the image capturing element is in an activated state, controlling the interval between the pixels in the first area to be the first interval, and controlling the interval between pixels in the display area of the flexible display screen other than the first area to be a second interval. The first interval may be greater than the second interval such that when the image capturing element is in the activated state, by setting the interval between the pixels in the first area as the first interval, the interval between the pixels in the first area can be increased, such that the image capturing element can receive the external light. Further, by setting the interval between the pixels in other areas of the flexible display screen as the second interval, the proportion of the display area in the flexible display screen can be ensured, and the display area of the flexible display screen can be increased.

In some embodiments, if the image capturing element is in the activated state, determining the relative position of the flexible display screen and the image capturing element based on the state of the flexible display screen may include, if the flexible display screen is in the second state and the image capturing element is in the activated state, controlling the interval between pixels in the second area to be the first interval, and controlling the interval between pixels in the display area of the flexible display screen other than the second area to be the second interval. The first interval may be greater than the second interval such that when the image capturing element is in the activated state, by setting the interval between the pixels in the second area as the first interval, the interval between the pixels in the second area can be increased, such that the image capturing element can receive the external light. Further, by setting the interval between the pixels in other areas of the flexible display screen as the second interval, the proportion of the display area in the flexible display screen can be ensured, and the display area of the flexible display screen can be increased.

In some embodiments, if the image capturing element is in the activated state, determining the relative position of the flexible display screen and the image capturing element based on the state of the flexible display screen may include, if the flexible display screen is switched from the first state to the second state and the image capturing element is in the activated state, dynamically adjusting the interval between at least some pixels in the first pixel area to the first interval, thereby realizing the switch from the first state to the second state.

In some embodiments, if the flexible display screen is switched from the first state to the second state and the image capturing element is in the activated state, dynamically adjusting the interval between at least some pixels in the first pixel area to the first interval to realize the switch from the first state to the second state may include, if the first area and the second area at least partially overlap, then if the flexible display screen is switched from the first state to the second state, and the image capturing element is in the activated state, dynamically adjusting the interval between pixels in the second area that does not overlap with the first area in the first pixel area to the first interval to realize the switch from the first area to the second area. In this way, when the capturing area of the image capturing element corresponds to the second area, the amount of light that the image capturing element received can be increased. In some embodiments, if the flexible display screen is switched from the first state to the second state and the image capturing element is in the activated state, dynamically adjusting the interval between at least some pixels in the first pixel area to the first interval to realize the switch from the first state to the second state may further include, if the first area and the second area at least partially overlap, the flexible display screen is switched from the first state to the second state, and the image capturing element is in the activated state, dynamically adjusting the interval between pixels in the first area that does not overlap with the second area in the first pixel area to the second interval. In this way, on the basis of realizing the switching from the first area to the second area, the display quality of the area that does not overlap with the second area in the first area can be improved, thereby improving the display quality of the electronic device.

In some embodiments, if the flexible display screen is switched from the first state to the second state and the image capturing element is in the activated state, dynamically adjusting the interval between at least some pixels in the first pixel area to the first interval to realize the switch from the first state to the second state may include, if the first area and the second area do not overlap, then if the flexible display screen is switched from the first state to the second state, and the image capturing element is in the activated state, dynamically adjusting the interval between pixels in the second area in the first pixel area to the first interval to realize the switching from the first area to the second area. In this way, when the capturing area of the image capturing element corresponds to the second area, the amount of light that the image capturing element received can be increased. In some embodiments, if the flexible display screen is switched from the first state to the second state and the image capturing element is in the activated state, dynamically adjusting the interval between at least some pixels in the first pixel area to the first interval to realize the switch from the first state to the second state may further include, if the first area and the second area do not overlap, when the flexible display screen is switched from the first state to the second state and the image capturing element is in the activated state, dynamically adjusting the interval between pixels in the first area in the first pixel area to the second interval. In this way, on the basis of realizing the switching from the first area to the second area, the display quality of the first area can be improved, thereby improving the display quality of the electronic device.

In some embodiments, if the image capturing element is in the activated state, determining the relative position of the flexible display screen and the image capturing element based on the state of the flexible display screen may include, if the flexible display screen is switched from the second state to the first state and the image capturing element is in the activated, dynamically adjusting the interval between at least some pixels in the first pixel area to the first interval to realize the switching form the second area to the first area.

In some embodiments, if the flexible display screen is switched from the second state to the first state and the image capturing element is in the activated, dynamically adjusting the interval between at least some pixels in the first pixel area to the first interval to realize the switching form the second area to the first area may include, if the first area and the second area at least partially overlap, then if the flexible display screen is switched from the second state to the first state and the image capturing element is in the activated state, dynamically adjusting the interval between pixels in the first area that does not overlap with the second area in the first pixel area to the first interval to realize the switching from the second area to the first area. In this way, when the capturing area of the image capturing element corresponds to the first area, the amount of light that the image capturing element receives can be increased. In some embodiments, if the flexible display screen is switched from the second state to the first state and the image capturing element is in the activated, dynamically adjusting the interval between at least some pixels in the first pixel area to the first interval to realize the switching form the second area to the first area may further include, if the second area and the first area at least partially overlap, the flexible display screen is switched from the second state to the first state, and the image capturing element is in the activated state, dynamically adjusting the interval between pixels in the second area that does not overlap with the first area in the first pixel area to the second interval. In this way, on the basis of realizing the switching from the second area to the first area, the display quality of the area that does not overlap with the first area in the second area can be improved, thereby improving the display quality of the electronic device.

In some embodiments, if the flexible display screen is switched from the second state to the first state and the image capturing element is in the activated, dynamically adjusting the interval between at least some pixels in the first pixel area to the first interval to realize the switching form the second area to the first area may include, if the first area and the second area do not overlap, then if the flexible display screen is switched from the second state to the first state, and the image capturing element is in the activated state, dynamically adjusting the interval between pixels in the first area in the first pixel area to the first interval to realize the switching from the second area to the first area. In this way, when the capturing area of the image capturing element corresponds to the second area, the amount of light that the image capturing element received can be increased. In some embodiments, if the flexible display screen is switched from the second state to the first state and the image capturing element is in the activated, dynamically adjusting the interval between at least some pixels in the first pixel area to the first interval to realize the switching form the second area to the first area may further include, if the first area and the second area do not overlap, when the flexible display screen is switched from the second state to the first state and the image capturing element is in the activated state, dynamically adjusting the interval between pixels in the second area in the first pixel area to the second interval. In this way, on the basis of realizing the switching from the second area to the first area, the display quality of the second can be improved, thereby improving the display quality of the electronic device.

In some embodiments, the method may further include controlling the interval between pixels in the entire display area of the flexible display screen to be the second interval if the image capturing element is in a non-activated state, where the first interval may be greater than the second interval. In this way, when the image capturing element is in the non-activated state, the interval between pixels in the first area and/or the second area may be the second interval, such that the pixel intervals of all display areas in the flexible display screen can be the same, and the display quality of the electronic device can be improved.

In one embodiment, dynamically adjusting the interval between at least some pixels in the first pixel area may include dynamically adjusting the density of pixels in at least part of the first pixel area to dynamically adjust the interval between at least part of the pixels in the first pixel area. In another embodiment of the present disclosure, dynamically adjusting the interval between at least part of the pixels in the first pixel area may include dynamically adjusting the density of pixels in at least part of the first pixel area and the display area of each pixel in the area to dynamically adjust the interval between at least part of the pixels in the first pixel area. The method of dynamically adjusting the interval between at least part of the pixels in the first pixel area is not limited in the present disclosure, and the method can be determined based on actual needs In some embodiments, the electronic device may further include a power element. In some embodiments, if the image capturing element is in the activated state, determining the relative position of the flexible display screen and the image capturing element based on the state of the flexible display screen may include controlling the power element of the electronic device to adjust the relative position of the flexible display screen and the image capturing element if the image capturing element is in the activated state, such that when the flexible display screen is in the first state, the first area of the flexible display screen may correspond to the capturing area of the image capturing element, and when the flexible display screen is in the second state, the second area of the flexible display screen may correspond to the capturing area of the image capturing element. In some embodiments, when the flexible display screen is in a different state, the area in the flexible display screen corresponding to the capturing area of the image capturing element may not be completely the same.

In one embodiment, if the image capturing element is in the activated state, controlling the power element of the electronic device to adjust the relative position of the flexible display screen and the image capturing element may include controlling the power element to adjust the position of the flexible display screen to adjust the relative position of the flexible display screen and the image capturing element if the image capturing element is in the activated state. In another embodiment, if the image capturing element is in the activated state, controlling the power element of the electronic device to adjust the relative position of the flexible display screen and the image capturing element may include controlling the power element to adjust the position of the image capturing element to adjust the relative position of the flexible display screen and the image capturing element if the image capturing element is in the activated state. In another embodiment, if the image capturing element is in the activated state, controlling the power element of the electronic device to adjust the relative position of the flexible display screen and the image capturing element may include controlling the power element to simultaneously adjust the position of the flexible display screen and the position of the image capturing element to adjust the relative position of the flexible display screen and the image capturing element if the image capturing element is in the activated state. It should be noted that the method of controlling the power element of the electronic device to adjust the relative position of the flexible display screen and the image capturing element is not limited in the present disclosure, and the method can be determined based on actual needs.

The following describes the adjustment of the relative position of the flexible display screen and the image capturing element using the power element by taking the adjustment of the position of the image capturing element as an example when the image capturing element is in the activated state.

In some embodiments, if the image capturing element is in the activated state, controlling the power element of the electronic device to adjust the relative position of the flexible display screen and the image capturing element may include controlling the power element to adjust the image capturing element to be in the first position such that the capturing area of the image capturing element may correspond to the first area of the flexible display screen if the flexible display screen is in the first state; controlling the power element to adjust the image capturing element to be in the second position such that the capturing area of the image capturing element may correspond to the second area of the flexible display screen if the flexible display screen is in the second state, where the first position may be different from the second position.

In some embodiments, the method may further include generating a trigger signal when the image capturing element is in the activated state. The trigger signal may be used to trigger the power element to adjust the relative position of the image capturing element and the flexible display screen, but the present disclosure is not limited thereto. In other embodiments, the power element may also be externally triggered to adjust the relative position of the image capturing element and the flexible display screen, which is not limited in the present disclosure.

In some embodiments, the method may further include obtaining the state of the image capturing element. When the image capturing element is in the activated state, the processing element may generate a trigger signal to trigger the power element to adjust the relative position of the image capturing element and the flexible display screen, however, the present disclosure is not limited thereto.

In some embodiments, the electronic device may further include a detection element, and the method may further include using the detection element to detect an angle between the first display part and the second display part. In some embodiments, determining the relative position of the flexible display screen and the image capturing element based on the state of the flexible display screen may include determining the relative position of the image capturing element and the flexible display screen based on the angle between the first display part and the second display part, where the angles between the first display part and the second display part may be different, and the position of the image capturing element may be different.

In some embodiments, the electronic device may further include a storage element. The storage element may be configured to store the correspondence between the angle between the first display part and the second display part and the movement distance of the image capturing element. In the embodiments of the present disclosure, determining the relative position of the image capturing element and the flexible display screen based on the angle between the first display part and the second display part may include determining the position of the image capturing element based on the angle between the first display part and the second display part and the corresponding relationship of the moving distance of the image capturing element to realize the adjustment of the relative position of the flexible display screen and the image capturing element.

In some embodiments, if the image capturing element is in the activated state, determining the relative position of the flexible display screen and the image capturing element based on the state of the flexible display screen may include determining the relative position of the image capturing element and the flexible display screen based on the preview images generated at different positions of the image capturing element in the state of the flexible display screen when the image capturing element is in the activated state.

Take the power element adjusting the position of the image capturing element as an example. In some embodiments, determining the relative position of the image capturing element and the flexible display screen based on the preview images generated at different positions of the image capturing element in the state of the flexible display screen may include controlling the power element to move the image capturing element in the first direction, and obtaining a preview image generated by the image capturing element in the current state of the flexible display screen; if the amount of image information included in the preview image generated by the image capturing element increases, continue moving the image capturing element in the first direction until the amount of image information included in the preview image generated by the image capturing element stops increasing; and if the amount of image information included in the preview image generated by the image capturing element reduces, moving the image capturing element in a second direction until the amount of image information included in the preview image generated by the image capturing element stops increasing, where the second direction may be opposite to the first direction, and the first direction and the second direction may be parallel to a direction in which the first display part points to the second display part.

should be noted that in the foregoing embodiment, the position where the preview image generated by the image capturing element including the largest amount of image information may be the position of the image capturing element.

In some embodiments, the image capturing element may be positioned below the flexible display screen. That is, the flexible display screen may be a complete display screen, and the image capturing element may be positioned below the non-display side of the flexible display screen. In some embodiments, the method may further include controlling the first area or the second area to be a transparent area if the image capturing element is in the activated state. More specifically, if the image capturing element is in the activated state and the flexible display screen is in the first state, the first area may be controlled to be a transparent area. Further, if the image capturing element is in the activated state and the flexible display screen is in the second state, the second may be controlled to be a transparent area. That is, if the image capturing element is in the activated state, the area corresponding to the capturing area of the image capturing element in the flexible display screen may be controlled to be a transparent area such that the image capturing element obtain external light through the flexible display screen.

In some embodiments, the flexible display screen may include a first through hole. The capturing area of the image capturing element may correspond to the first through hole, and external light may be obtained through the first through hole.

Consistent with the present disclosure, the information processing method provided by the embodiments of the present disclosure can be used to determine the relative position of the flexible display screen and the image capturing element based on the state of the flexible display screen when the image capturing element is in the activated state. When the flexible display screen is in a different state, the image capturing element may correspond to different areas of the flexible display screen, such that the capturing area of the image capturing element can receive external light. In this way, the images captured by the image capturing element can be complete and the user experience can be improved.

It should be noted that the various embodiments in the present specification are described in a progressive manner, and each embodiment focuses on differences from other embodiments, and the same similar parts between the various embodiments can be referred to each other.

The above description of the disclosed embodiments enables those having ordinary skills in the art to implement or use the present disclosure. Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. An electronic device, comprising:
 a flexible display screen; and
 an image capturing element fixed at a position of the electronic device;
 wherein:
 a capturing area of the image capturing element corresponds to a first area of the flexible display screen for the image capturing element to obtain external light through the first area in response to the flexible display screen being in a first state;

the capturing area of the image capturing element corresponds to a second area of the flexible display screen for the image capturing element to obtain external light through the second area in response to the flexible display screen being in a second state;

the first state and the second state are different, and the first area and the second area are at least partially different; and the flexible display screen is configured to move in response to the flexible display screen switching from the first state to the second state, to cause the capturing area of the image capturing element to switch from corresponding to the first area to corresponding to the second area.

2. The electronic device of claim 1, wherein:
the flexible display screen includes a first display part and a second display part, a first angle being formed between the first display part and the first display part when the flexible display screen is in the first state, a second angle being formed between the first display part and the second display part when the flexible display screen is in the second state, and the first angle being smaller than the second angle.

3. The electronic device of claim 2, wherein:
an interval between the pixels in the first area is controlled to be a first interval in response to the flexible display screen being in the first state and the image capturing element being in an activated state; and/or
an interval between the pixels in the second area is controlled to be a second interval in response to the flexible display screen being in the second state and the image capturing element being in the activated state; and/or
an interval between at least some pixels in the first pixel area is dynamically adjusted to the second interval to realize switching from the first area to the second area in response to the flexible display screen being switched from the first state to the second state and the image capturing element being in the activated state; and/or
the interval between at least some pixels in the first pixel area is dynamically adjusted to the first interval to realize switching from the second area to the first area in response to the flexible display screen being switched from the second state to the first state and the image capturing element being in the activated state; and/or
an interval between pixels in an entire display area of the flexible display screen is the second interval in response to the image capturing element being in a non-activated state, the first interval being greater than the second interval.

4. The electronic device of claim 2, further comprising:
a power element configured to adjust a relative position of the flexible display screen and the image capturing element in response to the image capturing element being in an activated state.

5. The electronic device of claim 4, wherein:
the power element is configured to control the image capturing element to be positioned at a first position for the capturing area of the image capturing element to correspond to the first area of the flexible display screen in response to the flexible display screen being in the first state;
the power element is configured to control the image capturing element to be positioned in a second position for the capturing area of the image capturing element to correspond to the second area of the flexible display screen in response to the flexible display screen being in the second state, the first position being different from the second position.

6. The electronic device of claim 1, wherein:
the flexible display screen includes a first pixel area and a second pixel area, an interval between pixels in the first pixel area being greater than an interval between pixels in the second pixel area, and both the first area and the second area belonging to the first pixel area.

7. The electronic device of claim 1, wherein:
the image capturing element is positioned below the flexible display screen, and the first area or the second area is controlled to be a transparent area in response to the image capturing element being in an activated state; or
a first through hole is disposed on the flexible display screen, and the capturing area of the image capturing element corresponds to the first through hole.

8. The electronic device of claim 1, further comprising:
a power element configured to:
in response to the flexible display screen being in a non-bending state, control the image capturing element to be positioned at a first position of the electronic device for the image capturing element to obtain the external light through the first area of the flexible display screen; and
in response to the flexible display screen being in a bending state, control the image capturing element to be positioned in a second position of the electronic device for the image capturing element to obtain the external through the second area of the flexible display screen, the first position being different from the second position.

9. The electronic device of claim 8, wherein the flexible display screen includes a first pixel area and a second pixel area, the first pixel area corresponds to the image capturing element, the first area and the second area are different areas belonging to the first pixel area, and the first pixel area is unchanged.

10. An information processing method for a display device, comprising:
determining a relative position of a flexible display screen of an electronic device and an image capturing element fixed at a position of the electronic device based on a state of the flexible display screen in response to the image capturing element being in an activated state, including:
determining that a first area of the flexible display screen corresponds to a capturing area of the image capturing element for the image capturing element to obtain external light through the first area in response to the flexible display screen being in a first state; and
determining that a second area of the flexible display screen corresponds to the capturing area of the image capturing element for the image capturing element to obtain external light through the second area in response to the flexible display screen being in a second state;
wherein:
the first state and the second state are different, and the first area and the second area are at least partially different; and the flexible display screen is configured to move in response to the flexible display screen switching from the first state to the second state, to cause the capturing area of the image capturing element to switch from corresponding to the first area to corresponding to the second area.

11. The method of claim 10, wherein determining the relative position of the flexible display screen and the image capturing element based on the state of the flexible display screen further includes:
controlling an interval between pixels in the first area to be a first interval in response to the flexible display screen being in the first state; or
controlling an interval between pixels in the second area to be the first interval in response to the flexible display screen being in the second state and the image capturing element being in the activated state.

12. The method of claim 11, wherein determining the relative position of the flexible display screen and the image capturing element based on the state of the flexible display screen further includes:
dynamically adjusting an interval between at least some pixels in a first pixel area to a second interval to realize switching from the first area to the second area in response to the flexible display screen being switched from the first state to the second state and the image capturing element being in the activated state; or
dynamically adjusting the interval between at least some pixels in the first pixel area to the first interval to realize switching from the second area to the first area in response to the flexible display screen being switched from the second state to the first state and the image capturing element being in the activated state; or
an interval between pixels in an entire display area of the flexible display screen being the second interval if the image capturing element is in a non-activated state, the first interval being greater than the second interval.

13. A computer readable medium storing computer program instructions, when executed by one or more processors, the computer program instructions implementing an information processing method, comprising:
determining a relative position of a flexible display screen of an electronic device and an image capturing element fixed at a position of the electronic device based on a state of the flexible display screen in response to the image capturing element being in an activated state, including:
determining that a first area of the flexible display screen corresponds to a capturing area of the image capturing element for the image capturing element to obtain external light through the first area in response to the flexible display screen being in a first state; and
determining that a second area of the flexible display screen corresponds to the capturing area of the image capturing element for the image capturing element to obtain external light through the second area in response to the flexible display screen being in a second state;
wherein:
the first state and the second state are different, and the first area and the second area are at least partially different; and
the flexible display screen is configured to move in response to the flexible display screen switching from the first state to the second state, to cause the capturing area of the image capturing element to switch from corresponding to the first area to corresponding to the second area.

14. The computer readable medium of claim 13, wherein determining the relative position of the flexible display screen and the image capturing element based on the state of the flexible display screen further includes:
controlling an interval between pixels in the first area to be a first interval in response to the flexible display screen being in the first state; or
controlling an interval between pixels in the second area to be the first interval in response to the flexible display screen being in the second state and the image capturing element being in the activated state.

15. The computer readable medium of claim 14, wherein determining the relative position of the flexible display screen and the image capturing element based on the state of the flexible display screen further includes:
dynamically adjusting an interval between at least some pixels in a first pixel area to a second interval to realize switching from the first area to the second area in response to the flexible display screen being switched from the first state to the second state and the image capturing element being in the activated state; or
dynamically adjusting the interval between at least some pixels in the first pixel area to the first interval to realize switching from the second area to the first area in response to the flexible display screen being switched from the second state to the first state and the image capturing element being in the activated state; or
an interval between pixels in an entire display area of the flexible display screen being the second interval in response to the image capturing element being in a non-activated state, the first interval being greater than the second interval.

* * * * *